May 26, 1964 G. GOETZ 3,134,213
LAWN MOWER APPARATUS
Filed Nov. 26, 1962 4 Sheets-Sheet 1
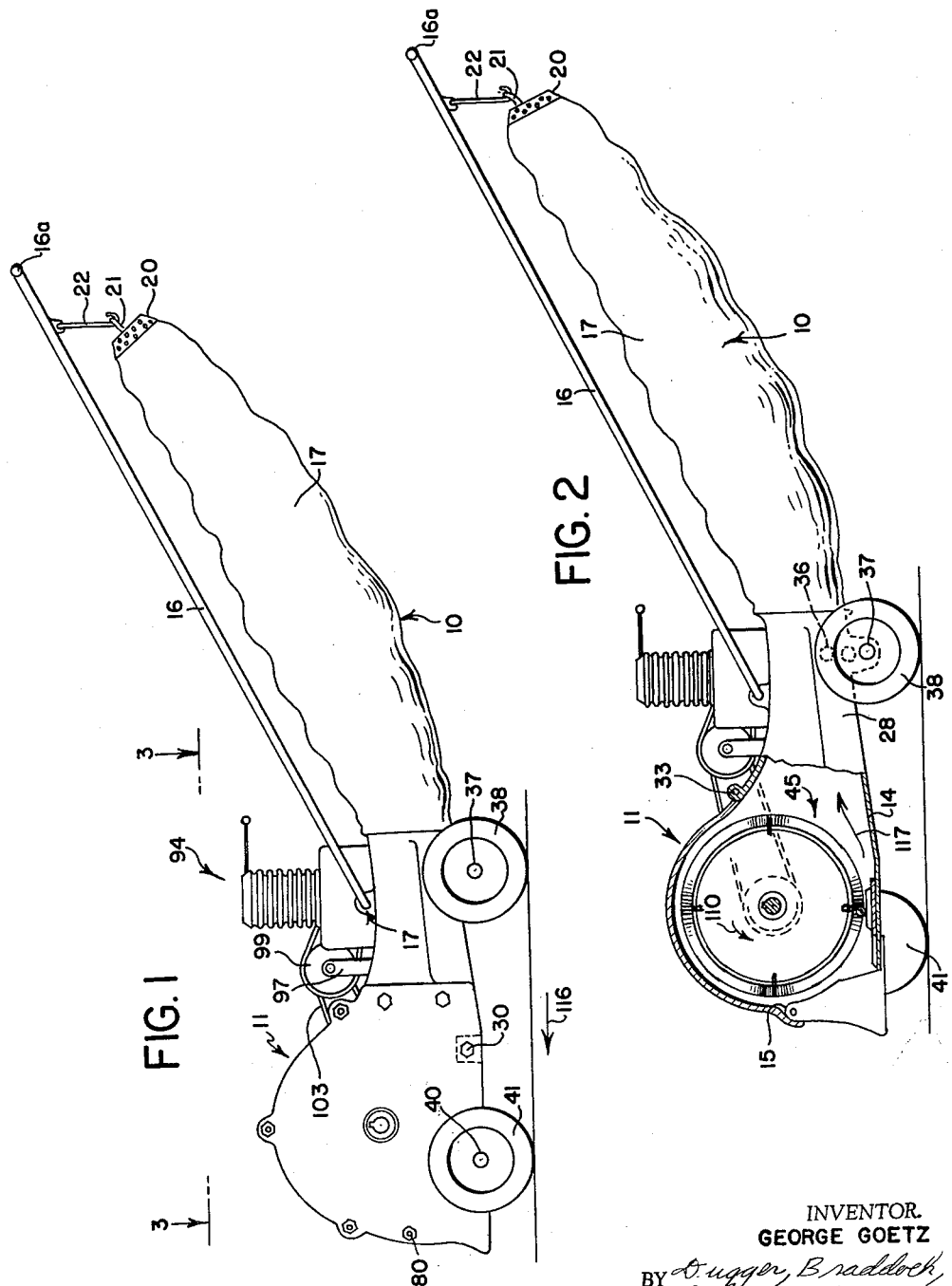
INVENTOR.
GEORGE GOETZ
BY Dugger, Braddock,
Johnson & Westman
ATTORNEYS May 26, 1964  G. GOETZ  3,134,213
LAWN MOWER APPARATUS
Filed Nov. 26, 1962  4 Sheets-Sheet 2
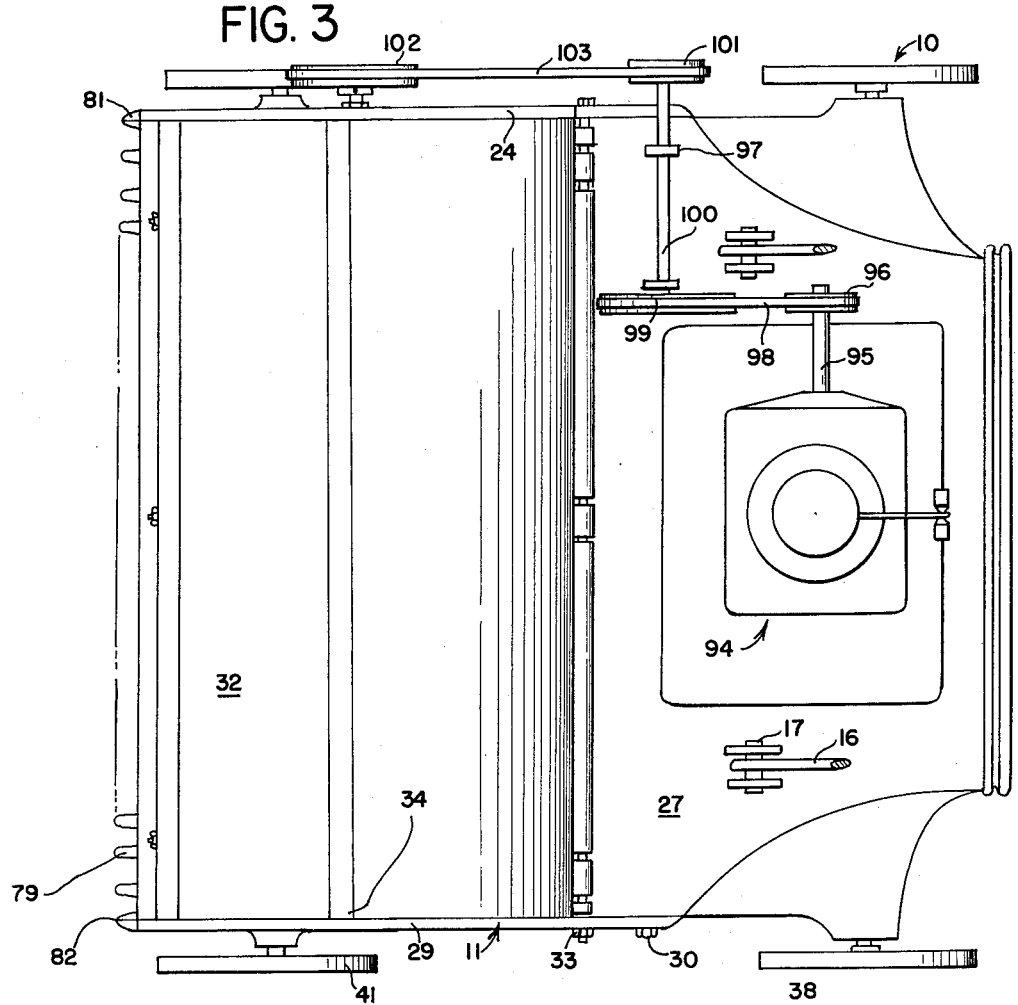
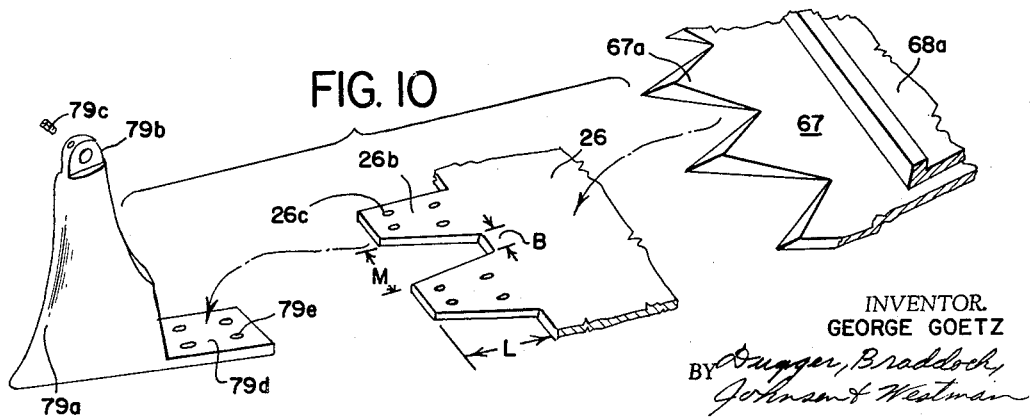
INVENTOR.
GEORGE GOETZ
BY Dugger, Braddock,
Johnson & Westman
ATTORNEYS May 26, 1964   G. GOETZ   3,134,213
LAWN MOWER APPARATUS
Filed Nov. 26, 1962   4 Sheets-Sheet 3

INVENTOR.
GEORGE GOETZ
BY Dugger, Braddock,
Johnson & Westman
ATTORNEYS

May 26, 1964  G. GOETZ  3,134,213
LAWN MOWER APPARATUS
Filed Nov. 26, 1962  4 Sheets-Sheet 4
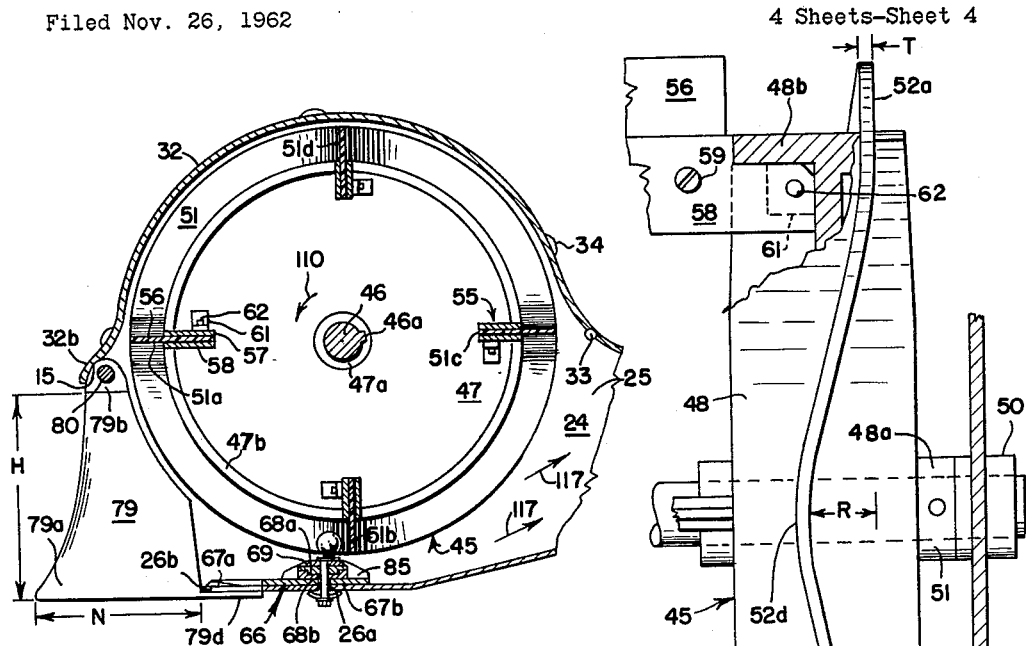
FIG. 5
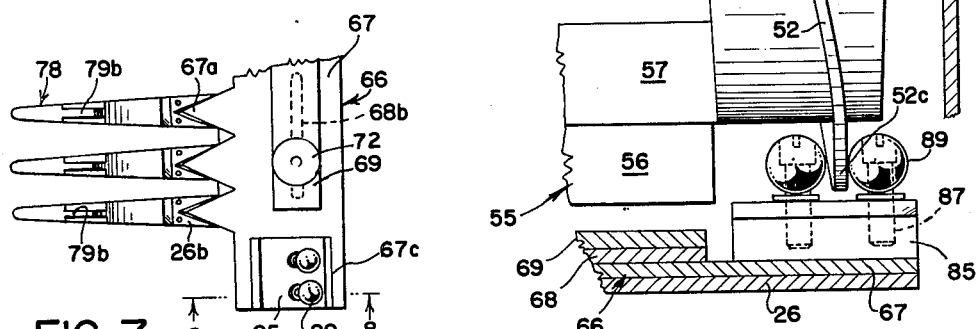
FIG. 7
FIG. 6
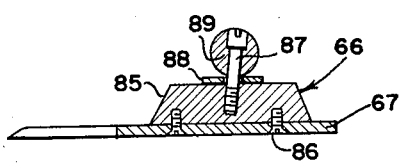
FIG. 8
INVENTOR.
GEORGE GOETZ
BY Dugger, Braddock,
Johnson & Westman
ATTORNEYS United States Patent Office 3,134,213
Patented May 26, 1964

3,134,213
LAWN MOWER APPARATUS
George Goetz, 522 3rd St., Bismarck, N. Dak.
Filed Nov. 26, 1962, Ser. No. 239,995
8 Claims. (Cl. 56—26.5)

This invention relates to new and novel improvements in apparatus for mowing grass and similar type plants. More particularly this invention relates to new and novel apparatus for driving a sickle bar of lawn mowers and similar types of equipment and to guard mechanism adjacent said sickle bar.

One of the objects of this invention is to provide new and novel reel type lawn mower apparatus having a reel assembly drivingly connected to an oscillating sickle bar. A further object of this invention is to provide new and novel lawn mower apparatus that utilizes a reel assembly for directing the grass into position for facilitating the sickle bar cutting said grass.

A still further object of this invention is to provide in lawn mower apparatus, drive structure and guard structure that minimizes the chances of a person being injured by the moving parts of said apparatus. Still another object of this invention is to provide new and novel lawn mower apparatus that includes the combination of reel assembly and guard structure for directing grass into position to be cut by a sickle bar and still at the same time minimizes the chances of a party using the mower being injured by the moving parts of the mower during the operation thereof.

Other and further objects are those inherent in the invention herein illustrated, described, and claimed, and will become apparent as the description proceeds.

To the accomplishment of the aforegoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which the corresponding numerals refer to the same parts and in which:

FIGURE 1 is a side elevational view of a lawn mower apparatus of this invention;

FIGURE 2 is a side elevational view corresponding to FIGURE 1 other than that a portion of one of the side panels has been broken away to more fully illustrate the reel and structure driven thereby;

FIGURE 3 is an enlarged fragmentary plan view generally taken along the line and in the direction of the arrows 3—3 of FIGURE 1;

FIGURE 5 is a longitudinal cross sectional view generally taken along the line and in the direction of arrows 5—5 of FIGURE 4 to more fully illustrate the reel assembly, guard structure and sickle bar structure together with the mounting of the aforementioned members;

FIGURE 6 is an enlarged fragmentary transverse view, part in cross section, to more fully illustrate the construction of the reel assembly and the drive connections to the sickle bar;

FIGURE 7 is a fragmentary plan view of the guard structure and one end portion of the sickle bar assembly;

FIGURE 8 is an enlarged longitudinal cross sectional view generally taken along the line and in the direction of arrows 8—8 of FIGURE 7 to more fully illustrate the mounting of the drive bearings on the sickle bar;

FIGURE 10 is an enlarged, fragmentary, exploded view shown in perspective to illustrate the mounting of the guard structure on the housing bottom wall.

Figure 4:
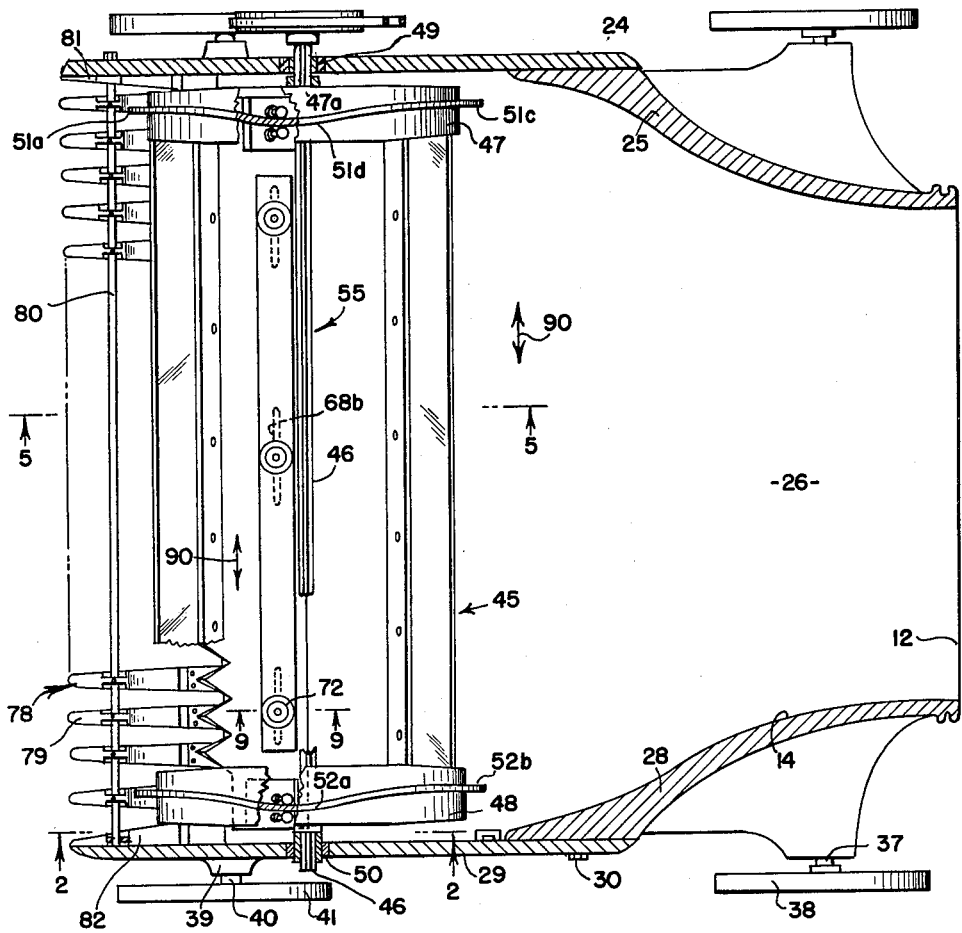
FIGURE 4 is a view corresponding to FIGURE 3 other than that the top portion of the casing including the cover and part of the reel assembly has been broken away to more fully illustrate the mounting of the reel assembly, sickle bar and drive connections and the guard structure.

Referring now in particular to FIGURES 1, 3 and 4, there is illustrated a side elevational view, a fragmentary plan view and a fragmentary horizontal cross sectional view, respectively, of the lawn mower apparatus, generally designated 10 of this invention. The lawn mower includes a housing 11 that encloses a chamber 14 other than for the rearwardly opening outlet 12 and the forwardly opening inlet 15. An elongated generally Y-shaped handle 16 having hand grip portions 16a is pivotally attached to the top wall 27 of the housing by pivot members 17. Removably attached to the rearward end of the housing by conventional means such as strap and clamp (not shown) is one end of a heavy fabric refuse bag 17, one open end of the bag being contiguous and opening to the outlet 12. The opposite end of the refuse bag is secured to an aperture plate 20 that permits the exit of air from the interior of the bag. An eye bolt 21 is secured to the plate 20, there being provided a chain 22 or similar member upon the handle adjacent the hand grip portion 16a for hookingly engaging the eye bolt.

The housing 11 includes a side wall 25, a bottom wall 26, a top wall 27, and second side wall 28 that are suitably joined together by conventional means such as welding. A side wall panel 24 and a side wall panel 29 are removably secured to the opposite forward longitudinal edge portions of the bottom wall and adjacent vertical edge portions of the side walls by conventional means such as cap screws 30. A cover 32 is hingably connected to the forward transverse edge of the top wall by hinge rod 33, the adjacent edge portions of the cover and top wall being shaped to form a piano type hinge. The cover is provided with a plurality of transversely extending reinforcing ribs 34. As may be noted from FIGURES 4 and 5 the housing chamber in vertical transverse cross section is generally rectangular in shape, the rearward section portion of the chamber being of reduced dimension due to the upward inclination of the rearward portion of the bottom wall and the inward curvature of the side walls in a rearward direction to form a throat as more fully illustrated in FIGURE 4.

Each of the side walls 25, 28 has a plurality of threaded apertures 36 that are arranged in vertical stacked relationship, there being provided stud bolts 37 threadable into said apertures for rotatably mounting the rear wheels 38. The apertures on opposite sides of the housing are horizontally aligned.

Formed on the lower forward end portions of each of the side panels 24 and 29 respectively is a boss 39 that threadedly mounts a stud bolt 40, the front wheels 41 being rotatably mounted on the respective stud bolt 40. Of course it is to be understood that the front wheels may be rotatably mounted on structure secured to the forward portion of the bottom wall.

Rotatably mounted within the forward portion of the chamber enclosed by the housing is a reel assembly, generally designated 45, the reel assembly and cover 32 in vertical longitudinal cross section generally being curved to form a relatively close fit as said assembly is rotated. The reel assembly includes an elongated transversely extending reel shaft 46 having a transversely extending key 46a. One end portion of the shaft 46 is journalled for rotation in a bushing 49 mounted on the side panel 24 while the opposite end portion is journalled for rotation in a bushing 50 that is mounted in the side panel 29. A drive wheel 47 having a hub 47a with a keyway therein is secured to one end portion of the shaft by a set screw (not shown) threaded in the hub, the wheel being located within the chamber 14 closely adjacent side panel 24. A corresponding drive wheel 48 of a similar construction is likewise secured to shaft 46 but on the opposite side of the chamber to be closely adjacent panel 29.

Each of the wheels 47 and 48 includes a relatively wide (axially extending) angular rim 47b and 48b respectively. Mounted on the respective rims are the undulated annular drive flanges 51 and 52 respectively. As may be noted in FIGURES 5 and 6 each drive flange extends generally radially outwardly from the respective rim and are undulated in a transverse axial direction to provide opposite axial cam surfaces. Preferably the undulations are sinusoidal in shape, each angular drive flange as illustrated having a pair of troughs and a pair of crests (crests 51a, 51c, 52a and 52c and troughs 51b, 51d, 52b and 52d for the respective flanges). The drive flanges are mounted on the respective rims so that the crest of one undulation is in the same angular position as the corresponding trough of the opposite flange whereby the transverse (axial) spacing between portions of the drive flanges in the same angular position is substantially the same throughout the circumferences of the drive flanges. The importance of this feature will become more apparent hereinafter.

Mounted between the wheels adjacent the rim portions thereof are a plurality of transversely extending wiper members generally designated 55, each wiper member including a wiper blade 56 made of a resilient material such as rubber, an elongated transversely extending holding plate 57, and a front supporting strip 58. Each end portion of the holding plate is secured to the adjacent wheel (47 or 48) by being bolted at 62 to an L-shaped lug 61 which in turn is either welded or bolted to the respective wheel (see FIGURES 5 and 6). Each front strip 58 is secured to a holding plate with the wiper blade extending therebetween by conventional means such as cap screws. As may be noted in FIGURE 5 the outer transverse edges of the members 57, 58 (other than the ear portions adjacent the lugs) are located the same radial distance from the shaft 46 as the outer circumference of the drive flanges while the wiper blades are of a substantially greater radial length so as to have their outer transverse edge spaced substantially the same distance from the axis of the shaft 46 as the outer peripheral edges of the drive flanges.

Figure 9:
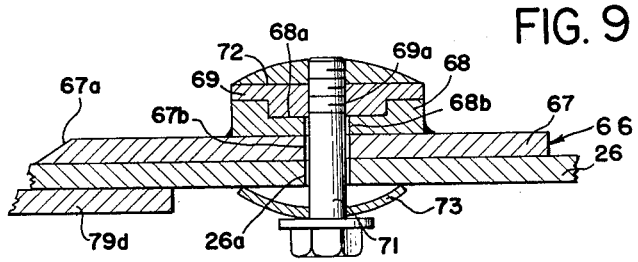
FIGURE 9 is a fragmentary longitudinal cross sectional view generally taken along the line and in the direction of arrows 9—9 of FIGURE 4 to more fully illustrate the structure for reciprocally mounting the sickle bar on the housing.

Mounted on the forward transverse portion of the bottom wall 26 for reciprocal movement in a transverse direction is a sickle bar assembly generally designated 66. The assembly 66 is positioned to generally underlie the forward angular portion of the reel assembly and includes a sickle bar 67 having a plurality of sickle blades 67a which may be formed integral with the bar or attached thereto in a conventional manner (see FIGURES 7, 9 and 10). Welded to the longitudinally rearward portion of the sickle bar is a transversely elongated slide bar 68 that has a transversely elongated groove 68a formed therein. Mounted on top of the sickle bar to have its offset form a sliding fit in the groove 68a is a hold down bar 69 of a slightly longer transverse length than the slide bar. Formed in the sickle bar and slide bar are a plurality of transversely elongated, contiguous slots 67b, 68b, while in the hold down bar and bottom wall respectively there are formed a corresponding number of apertures 69a and 26a. Through each adjacent set of slots and apertures there is extended a bolt 71 having a cap nut 72 threaded thereon to abut against the top surface of the hold down bar. A leaf spring 73 is mounted on the bolt between its head and the bottom of the bottom wall in order to urge the bolt 71 in a downward direction and thereby resiliently retain the offset of the hold down bar in the groove of the sickle bar and preventing the hold down bar moving transversely or longitudinally; while at the same time permitting members 67 and 68 to be transversely reciprocated relative to said hold down bar and bottom wall. The aforementioned reciprocation of members 67 and 68 is permitted to take place due to the closeness of fit of the apertures in the bottom wall and the hold down bar while no transverse or longitudinal movement of the last mentioned members takes place.

Referring now in particular to FIGURES 4, 5 and 10 the guard mechanism, generally designated 78 will now be described. The guard mechanism is mounted in the inlet opening of the housing to be located adjacent the sickle bar, said mechanism including a plurality of central guards 79 and end guards 81 and 82. Each of the guards 79 include a guard nose 79a that in longitudinal vertical elevation is substantially shaped as illustrated in FIGURE 5, the lower portions of the guard noses in horizontal cross section being generally triangular in shape other than for the blunt apex portions. On the upper apex portion of the guard nose there is integrally formed an aperture offset 79b to have a rod 80 extended therethrough, said rod being threaded on one end and having a bolt head on the other. A set screw 79c may be provided for securing each offset to the rod. The rod is located at a slightly lower elevation than the axis of rotation of the shaft 46 and slightly longitudinally forward of the apex portions of the sickle blades, there being provided apertures in the side panels 24 and 29 to have opposite ends of the rod 80 extended therethrough and a nut to be threaded on said rod.

Formed integral with the lower portions of each nose 79a to extend in a generally horizontal plane rearwardly thereof is a rectangular plate 79d, each of the plates 79d having a plurality of apertures 79e formed therein. The forward end portion of the bottom plate has a plurality of notches formed therein in order to provide the forwardly extending, generally trapezoidal shaped mounting tabs 26b. Formed in each tab are a plurality of apertures 26c that are located to overlie corresponding apertures 79e of a guard 79 whereby flat headed bolts may be extended through said apertures to attach each plate in underlying relationship to the respective tab. The longitudinal length of the aforementioned notched out portions and of the rectangular plates is slightly less than the corresponding altitude of the sickle blades (see FIGURE 7).

Each of the guards 81 and 82 are shaped so that together they would form a guard 79. That is each guard 81 and 82 has a vertical flat surface to abut against the adjacent side panel.

As may be noted in FIGURE 5 the longitudinally forward end portion 32b of the cover is curved outwardly and downwardly to form an overlying fit with the offset portions of the guards. Also to be mentioned is that the cover and side panels have conventional latch means (not shown) to releasably hold the cover in a closed position as illustrated in FIGURE 5.

In order to reciprocate the sickle bar, an abutment 85 is secured to each of the outer transverse end portions 67c of the sickle bar by means such as flat headed screws 86 (see FIGURES 5, 6, 7 and 8). Threaded into each abutment to have their elongated axis extend radially relative to the shaft 46 are two pairs of transversely spaced bolts 87. On each bolt 87 there is rotatably mounted a bearing 89 and a washer 88 between the bearing and the abutment. The transverse spacing between each adjacent pair of bearings is slightly greater than the thickness T of the corresponding drive flange. As may be noted in FIGURES 5 and 6, when the sickle bar assembly is reciprocally mounted on the bottom wall, each of the drive flanges extends between the adjacent set of bearings 89 to be in driving relationship thereto to in effect provide a cam follower to bear against the adjacent cam surface. Thus as the drive flanges are rotated, the bearings are forced to move in one of the directions of the double arrow 90 due to the undulated shape of the drive flanges. However the bearings are rotatably held on the bolts 87 to minimize the friction between said bearings and drive flange.

In order to drive the reel assembly, a gasoline engine 94 is mounted on the top plate 27, said engine having a drive shaft 95 (see in particular FIGURE 3). Keyed to the outer end of the drive shaft 95 is a small drive sheave 96, sheave 96 being drivingly connected to the intermediate large pulley sheave 99 by the belt 98. Pulley sheave 99 is keyed to one end of the shaft 100 which is journalled for rotation by bearing members 97 mounted on the housing top plate 27. On the opposite end of the shaft 100 there is keyed a small intermediate pulley sheave 101 that is drivingly connected to the reel pulley sheave 102 by the belt 103. The reel pulley sheave in turn is keyed on the outer transverse edge portion of the reel shaft 46 that extends outwardly of the side panel 24.

The structure of the apparatus of this invention having been described, the operation thereof will now be set forth. First the rear wheel stud bolts 37 are threaded into appropriately horizontally aligned apertures 36 in order to set the sickle blades at the desired height about the ground for cutting the grass. Now assuming that the apparatus is completely assembled, the engine is started and through the pulley sheaves and belts described in the preceding paragraph the reel assembly 45 is drivenly rotated in the direction of the arrow 110. The annular drive flanges 51 and 52 are likewise rotated. Accordingly if it's assumed the relative positions of the annular flange and the bearings when the drive wheels start rotating are as illustrated in FIGURE 7 (crest 52c and trough 51b engaging the respective bearings); then upon initial rotation of the flange one quarter turn, the trough 52d and crest 51a are moved between the bearings. In this connection it is to be mentioned that the portion 51b of the annular drive flange 51 (see FIGURE 5) which is between the bearings is of maximum spacing from the side wall 24 and that when the wheel is rotated 90° the portion 51a which is of minimum spacing from the side panel 24 is intermediate the bearings. This results in the bearings being forced to move in the direction of the arrow 115 a distance R (see FIGURE 6) and likewise causes the sickle bar to move. It is to be mentioned for each drive flange, for the first 90° of rotation from position of FIGURE 6, first one axial surface forces one bearing to move in one direction (arrow 115) and then for the next 90° the opposite axial surface forces the other bearing to move in the opposite direction. Since the sickle bar can only move in a transverse direction, the angular movement of the annular flanges cause the bearing members and the sickle bar assembly to move first in the direction of arrow 115 a distance R. After it has moved said distance then the annular flanges curve in the opposite direction to thereby cause the bearings of the sickle bar assembly to move in a direction opposite arrow 115. Since the annular flanges have two sets of crests and troughs, for every 360° rotation of the reel assembly, the sickle bar assembly makes two complete reciprocal cycles (moves in the direction of arrow 115 twice and opposite arrow 115 twice). In this connection the abutments 85 are sufficiently transversely spaced from the adjacent ends of the slide bar so that the abutments are not stuck by the hold down bar during the reciprocation of the sickle bar.

If during the time the reel assembly is rotating, and the lawn mower apparatus is being moved in a forward cutting direction (arrow 116), then the guards are moved relative to the grass so as to direct grass intermediate adjacent guards in opposite transverse direction so as to enter between an adjacent pair of plates 26b and accordingly positions the grass to be cut by the reciprocating sickle bar assembly. At the same time, due to the angular movement of the wiper blades, the wiper blades will successively contact the top portion of the grass entering between the guards and bend it in a rearwardly direction to facilitate cutting the grass. As a result of the aforementioned action, the grass is cut without pulling and accordingly yields a very even cut swath.

Immediately after the grass has been cut by the sickle blades, the continued movement of wiper blades angularly rearwardly of the sickle blades, causes the cut grass to move rearwardly in the direction of arrows 117 to move it into the rearward portion of the housing. Additionally the rotational movement of the wiper blades sets up an air flow which causes air and cut grass to move from the housing inlet and thence rearwardly through the throat portion of the housing and exit through the housing outlet into the bag. That is the air flow sweeps the cut grass from the area of the sickle blade and causes it to move into the bag. Due to the provision of the apertured plate at the upper end of the bag, the air introduced into the bag due to the rotational movement of the reel assembly is allowed to escape, however, the grass is deposited in the bag prior to the time the air stream has reached the apertured plate.

To more fully appreciate one of the safety features of this invention, but not as a limitation, an example of the dimensions of the apparatus are set forth hereinafter. For example, with a motor turning at 2400 r.p.m., the pulley sheave 96 being 2½ inches in diameter, the pulley sheave 99 being 6 inches in diameter, the pulley sheave 101 being 2½ inches in diameter, the pulley sheave 102 being 6 inches in diameter, and the reel rim flange having a maximum diameter of 8 inches, the reel assembly will be moving at 500 r.p.m. Since for every 360° rotation of the reel assembly, the bearings engage two crest portions and two trough portions of the annular drive flanges, the sickle bar makes 1000 complete cycles per minute. Due to the speed of rotation of the reel assembly and the fact that the most radially outwardly extending portions of the reel assembly intermediate the drive flanges is made of a resilient material, no substantial degree of injury is incurred by an operator opening the cover and sticking his hand down into the area of the reel assembly.

With respect to another safety feature of this invention an example of dimensions of the sickle bar drive structure and the sickle bar will be set forth. With 60° sickle blades having an altitude of 0.866 inch, the spacing between the apex portions of two adjacent blades one inch and the dimension L (altitude of a notch) would be slightly greater than one inch. The transverse dimension B of the minor base of the notch is approximately ⅜ of an inch while the dimension of the maximum base of the notch, dimension M is approximately 1 inch. Since the height H of a guard is approximately 4 inches and the length N of the nose is approximately 3 inches, it is only with extreme difficulty, if possible, that an operator could move his fingers into position whereby they could be cut by the oscillating sickle bar. This substantially eliminates the danger of an operator accidentally injuring himself while the mower is in operation. Additionally due to the high speed of movement of the sickle bar, most objects entering intermediate the pair of guards will be cut, including small diameter rods and wires.

With the parts being of the dimensions set forth above, the drive flanges each are of a radial dimension of ¾″ while the dimension R is about one inch. This gives sufficient movement of the sickle bar to provide the desired cutting action.

Another feature of this invention which is to be noted is that the guards may be easily replaced. For example if one of the guards is to be replaced, then all that needs to be done is to loosen set screw 79c, remove the rod 80 and unthread the set screw that holds the guard to its mounting tab 26b. If the repairs are to be made on the sickle bar, then upon opening the cover 32, removing the pulley sheave 102 and loosening the reel hub set screws, the shaft can be completely pulled away from the housing and the remaining portion of the reel assembly lifted out of the housing chamber. In the reassemblying operation, the key on the reel shaft and key ways in the drive wheel hub and bushing will properly align the drive wheels and drive flanges. After the reel assembly has been removed from the housing, then the sickle bar assembly may be removed by first removing the cap nuts 72 from the bolts 71 and thence lifting out the hold down bar and sickle bar.

In the event that it is desired to modify the apparatus described heretofore to provide two oppositely moving sickle bar assemblies, one overlying the other, then the underlying sickle bar would only have the set of bearings to be driven such as shown in FIGURE 6 while the other sickle bar would have a corresponding set of bearings positioned to be driven by the opposite drive flange. In such a case the annular flange 50 would be rotated 90° relative to the annular flange 51 so that the sickle bar would be driven in opposite directions.

Although for the dimensions given and the apparatus described for conventional lawn mower, it is to be understood that the same drive mechanism for a sickle bar can be used in larger machines by using heavier constructive parts and parts of larger dimensions. Additionally the lawn mower apparatus may be modified to have a reel assembly driven by one of the ground engaging wheels in place of the engine by providing a drive sheave on an axle keyed to the ground engaging wheel.

Also it is to be understood that a speed reducer may be used with the engine and the drive flanges have a greater number of undulations (crest and troughs) to give, for example 3 or 4 complete reciprocal cycles for every 360° revolution of the reel assembly. Also through the use of a clutch, and drive connections, either the front or rear wheels may be driven by the gasoline engine.

As many widely apparently different embodiments of this invention may be made without departing from the spirit and scope thereof, it is to be understood that I do not limit myself to the specific embodiments herein.

What I claim is:

1. In lawn mower apparatus for cutting grass while moving in a forward longitudinal direction, a housing enclosing a chamber having a forwardly opening inlet and rearwardly opening outlet, said housing having a bottom wall and opposed side panels, a plurality of ground engaging wheels mounted on said housing for supporting it elevated to the ground, a reel assembly rotatably mounted in said housing chamber adjacent the inlet, said reel assembly including a transverse shaft, a drive wheel keyed on either end portion of the shaft, within said chamber, and adjacent each side panel, and a plurality of circumferentially spaced wiper members mounted on the outer peripheral portions of drive wheels, a sickle bar assembly reciprocatably mounted on the bottom wall adjacent said inlet, said sickle bar assembly including an elongated, transversely extending sickle bar, means attached to the bottom wall for mounting the sickle bar for reciprocal movement and means mounted on said sickle bar adjacent one of said drive wheels for following a cam, said reel assembly including an annular cam on a drive wheel for imparting reciprocal movement to said cam follower means as said drive wheel rotates, and means mounted on said housing for drivingly rotating said reel assembly.

2. The structure of claim 1 further characterized in that said wiper members each include a resilient member having an outer transverse edge located radially adjacent the outer periphery of said cam.

3. The structure of claim 1 further characterized in that said cam is undulated in an axial direction and has transversely oppositely faced cam surfaces and that said cam follower means include a pair of bearings, one bearing positioned to bear against each cam surface.

4. The structure of claim 1 further characterized in that said reel assembly shaft has a transversely extending key, each drive wheel having a key way to have said key extended therethrough, there being an annular cam on each drive wheel, and that said sickle bar assembly includes second cam follower means adjacent the other cam to be driven thereby.

5. In lawn mower apparatus for cutting grass while mowing in a forward longitudinal direction, a housing enclosing a chamber having a forwardly opening inlet and a rearwardly opening outlet, said housing having a bottom wall and opposite side panels, a plurality of ground engaging wheels mounted on said housing for movably supporting it in an elevated condition, a reel assembly rotatably mounting in said housing chamber adjacent said inlet, said reel assembly including a pair of reel wheels, each having an annular, axially undulated drive flange, the flanges undulations being the same size, shape and correspondingly angularly positioned to be of the same transverse spacing throughout, a sickle bar assembly mounted on the bottom wall adjacent said inlet, said sickle bar assembly including an elongated transversely extending sickle bar, means mounting said sickle bar on the bottom wall for transverse reciprocal movement, and means mounted on either end portion of the sickle bar for being reciprocally moved by the adjacent drive flange.

6. The structure of claim 5 further characterized in that said sickle bar includes sickle blades and that there is provided guard mechanism mounted on said bottom wall to extend across said inlet opening, said guard mechanism including a plurality of transversely spaced guards, each guard having a nose portion of a height to extend substantially above the sickle bar and in horizontal cross section diverging in a rearward direction, and a plate portion extending rearwardly of the nose portion and beneath the sickle blades for being attached to the bottom wall.

7. The structure of claim 6 further characterized in that said housing includes a top wall and a cover hingedly connected to said top wall, said cover being curved to in longitudinal cross section form a close fit with the upper half of the reel assembly.

8. The structure of claim 6 further characterized in that each guard nose portion has a transversely apertured offset and that the guard mechanism includes a transverse rod mounted on said side panels and extended through the apertured slots.

References Cited in the file of this patent

UNITED STATES PATENTS

| | | |
|---|---|---|
| 1,689,402 | Noack | Oct. 30, 1928 |
| 1,858,690 | Stokes | May 17, 1932 |
| 2,270,646 | Campbell | Jan. 20, 1942 |
| 2,457,490 | Press | Dec. 28, 1948 |
| 2,530,733 | Ronning | Nov. 21, 1950 |